Figure 1:
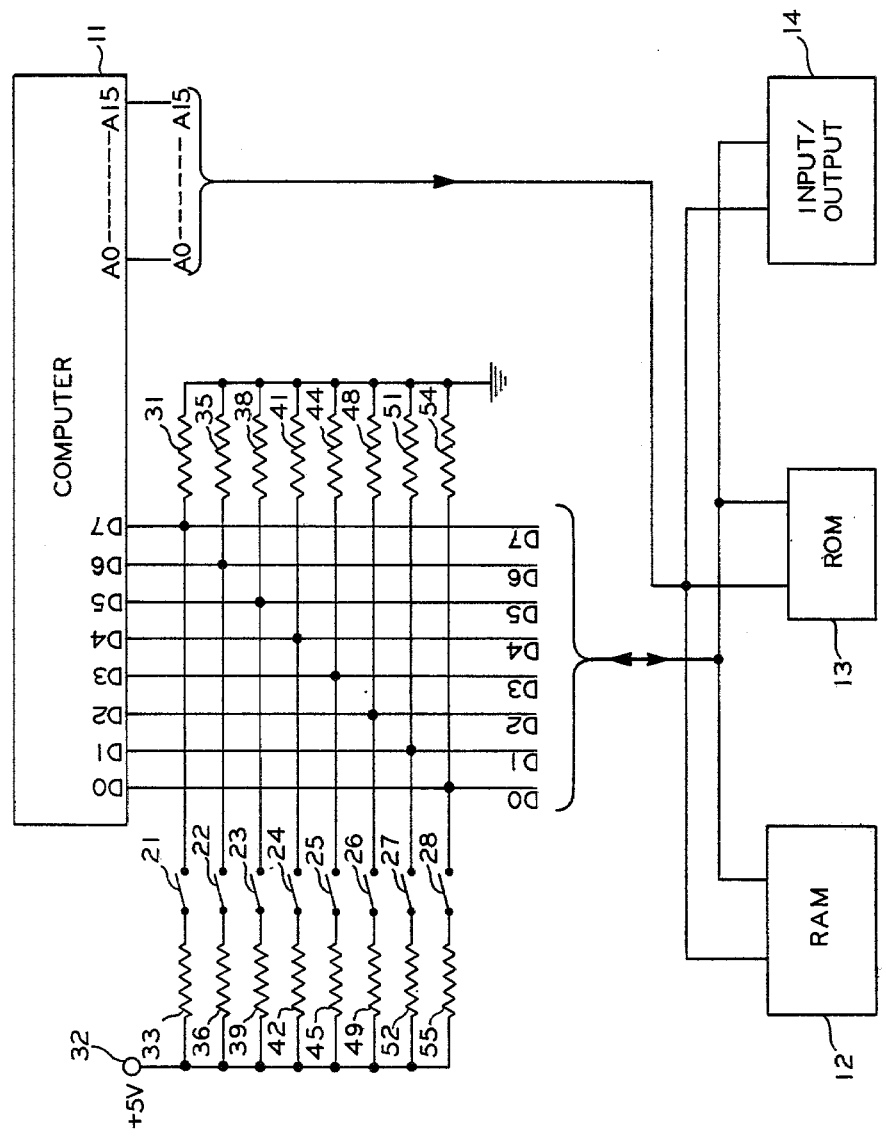

United States Patent [19]
DeShon

[11] 4,348,670
[45] Sep. 7, 1982

[54] COMPUTER ACQUISITION OF DATA FROM NONADDRESSABLE SWITCHES

[75] Inventor: Wallace E. DeShon, Bartlesville, Okla.

[73] Assignee: Phillips Petroleum Company, Bartlesville, Okla.

[21] Appl. No.: 116,438

[22] Filed: Jan. 29, 1980

[51] Int. Cl.³ .......................... H04Q 9/00; G08C 9/00
[52] U.S. Cl. ............................ 340/825.78; 340/825.89
[58] Field of Search ........... 340/365 S, 147 P, 825.78, 340/501, 825.89

[56] References Cited

U.S. PATENT DOCUMENTS

| | | | |
|---|---|---|---|
| 4,106,011 | 8/1978 | Melanson et al. | 340/365 S |
| 4,188,626 | 2/1980 | Frantz et al. | 340/365 S |
| 4,189,719 | 2/1980 | Massa et al. | 340/501 |
| 4,231,016 | 10/1980 | Ueda | 340/825.89 |

*Primary Examiner*—Donald J. Yusko

[57] ABSTRACT

In a computer system in which address lines and data lines are utilized to interface bus devices to the computer, data is provided to the computer from nonaddressable switches by connecting at least a portion of the data lines to ground through a pull-down resistor and to a positive voltage through a switch and a pull-up resistor. Depending upon the position of the switches associated with each data line, each data line will be pulled to a high logic level or a low logic level when the data lines are in the tristate high impedance mode. The computer can read the contents of the switches even though the switches have no associated address decoding or bus driving circuitry.

3 Claims, 1 Drawing Figure

COMPUTER ACQUISITION OF DATA FROM NONADDRESSABLE SWITCHES

This invention relates to method and apparatus for transferring information to a computer. In a specific aspect this invention relates to method and apparatus for transferring information to a computer from switches which have no associated address decoding circuitry or bus driving circuitry.

In a typical computer system, an address bus and a data bus is utilized to interface a computer to bus devices such as memory or input/output devices. In such computer systems, it is also typical to use various types of switches such as thumb wheel, rotary or push button to transfer information to the computer. These switches are typically utilized to allow operator interface with the computer. Generally, the use of switches to transfer information to the computer requires that the particular switch must be addressed and this address must be decoded to enable a particular switch. Once the particular switch is enabled the data programmed on the switch is transferred through bus driving circuitry to the data bus and thus to the computer. Thus, in addition to the switches, address decoding circuitry and bus driving circuitry are generally required to enable the transfer of data from a switch to the computer via the data bus.

In any system, cost considerations are important. Computer based systems are no exception. While it is generally necessary to use switches to allow operator intervention in a computer system, it would be desirable to be able to transfer information from switches without the need for address decoding circuitry or bus driving circuitry. It is thus an object of this invention to provide method and apparatus for transferring information to a computer from switches which have no associated address decoding circuitry or bus driving circuitry.

In accordance with the present invention, method and apparatus is provided whereby at least a portion of the data lines in a computer system are electrically connected to ground through pull-down resistors and are electrically connected to a positive voltage supply through pull-up resistors. A switch is electrically connected between each of the pull-up resistors and the respective data lines electrically connected to the pull-up resistors. When it is desired to transfer data from the switches to the computer, the computer provides an address to the bus devices which is not decoded by any of the bus devices. When this condition occurs, the data bus lines will be in a tristate or high impedance mode. This will allow the data bus lines to be pulled to a high logic level or a low logic level depending upon the position of the switches associated with each of the pull-up resistors. Thus, the computer can read the contents of each switch (the position of each switch) even though the switch has no address decoding or bus driving circuitry. This results in a considerable cost savings for computer based systems which utilize switches to allow operator intervention in the computer system.

Other objects and advantages of the invention will be apparent from the foregoing brief description of the invention and from the claims as well as from the detailed description of the drawing in which:

FIG. 1 is a schematic representation of the data transfer system of the present invention.

The invention is described in terms of a particular computer system which has eight data lines with each of the eight data lines being associated with a switch. However, the invention is applicable to other computer systems having more or less data lines and is also applicable to the use of only one data line to transfer information from a switch to the computer.

Referring now to the drawing, there is illustrated a very basic conventional computer system. A computer 11 is electrically connected to a plurality of bus devices which include the random access memory 12, the read only memory 13 and the input/output devices 14 through the A0-A15 address lines and the D0-D7 data lines. Preferably, the computer is a 6800 microprocessor manufactured by Motorola Semiconductor. The bus devices are devices which may be interfaced to the 6800 microprocessor. Typically, the computer 11 addresses a particular bus device to enable that particular bus device. The information contained in that particular device is then transferred to the computer via the D0-D7 data lines. In a conventional computer system, this addressing would also be required for the switches which are utilized to allow an operator to transfer information to the computer. As has been previously stated, this address would require decoding and the response of the switches would require bus driving circuitry in order to transfer information to the computer.

In the present invention, the plurality of switches 21-28 are utilized to allow an operator to transfer information to the computer. Since there are eight data lines, eight bits of information can be transferred to the computer using the switches 21-28. If it was desired to transfer only one bit of information to the computer, only one switch, electrically connected to one data line, would be required. The D7 data line is electrically connected to ground through the pull-down resistor 31 and is also electrically connected to the plus five volt power supply 32 through the switch 21 and the pull-up resistor 33. The D6 data line is electrically connected to ground through the pull-down resistor 35 and is electrically connected to the plus five volt power supply 32 through switch 22 and the pull-up resistor 36. The D5 data line is electrically connected to ground through the pull-down resistor 38 and is also electrically connected to the plus five volt power supply 32 through the switch 23 and the pull-up resistor 39. The D4 data line is electrically connected to ground through the pull-down resistor 41 and is also electrically connected to the plus five volt power supply 32 through the switch 24 and the pull-up resistor 42. The D3 data line is electrically connected to ground through the resistor 44 and is also electrically connected to the plus five volt power supply 32 through the switch 25 and the pull-up resistor 45. The D2 data line is electrically connected to ground through the pull-down resistor 48 and is also electrically connected to the plus five volt power supply 32 through the switch 26 and the pull-up resistor 49. The D1 data line is electrically connected to ground through the pull-down resistor 51 and is also electrically connected to the plus five volt power supply 32 through switch 27 and the pull-up resistor 52. The D0 data line is electrically connected to ground through the resistor 54 and is also electrically connected to the plus five volt power supply 32 through switch 28 and the resistor 55.

When it is desired to transfer information from the switches 21-28 to the computer 11, the computer 11 provides an address which is not decoded by any of the bus devices. When this condition occurs, the D0-D7 data lines will be in a tristate or high impedance mode. Depending upon the position of the switches 21-28, the D0-D7 data lines will be pulled to a low logic level or a high logic level. For the 6800 microprocessor, if the switches 21-28 are open then the corresponding data lines will be pulled to a voltage level which has a maximum of 0.8 volts by the pull-down resistors which are electrically connected to ground. If the switches 21-28 are closed then the respective data lines will be pulled to a voltage level which has a minimum of 2 volts by the pull-up resistors which are electrically connected to the plus five volt power supply 32. In this manner, eight bits of information may be transferred from the switches 21-28 to the computer 11 without the need for any address decoding or bus driving circuitry.

The presence of the pull-up resistors, pull-down resistors and the switches in the data lines do not effect the transfer of data from the bus devices to the computer 11 because the bus devices each contain drivers which are active devices. The level of the voltage on the data lines may be effected but the effect will not be sufficient to change the data transferred from the bus devices to the computer.

In the present invention, the preferred value of the pull-up resistors is 8 K ohms. The preferred value of the pull-down resistors is 100 K ohms. Obviously, other resistance values could be utilized so long as the high logic level exceeds the threshold level for the particular computer system and the low logic level does not exceed the low logic threshold for the particular computer system. The resistance value of the pull-up resistors and pull-down resistors will typically be a function of the number of bus devices in the computer system which are electrically connected to the data lines.

While the invention has been described in terms of the presently preferred embodiment, reasonable variations and modifications are possible by those skilled in the art, within the scope of the described invention and the appended claims.

That which is claimed is:

1. In a computer system in which a computer is interfaced to at least one computer bus device through address bus lines and data bus lines and in which an address from said computer which is not decoded by said at least one computer bus device results in said data bus lines being in a high impedance mode, the improvement comprising:
   at least one switch having first and second terminals;
   means for electrically connecting the first terminal of said at least one switch to a first data bus line;
   a pull-up resistor;
   a positive voltage supply;
   means for electrically connecting the second terminal of said at least one switch through said pull-up resistor to said positive voltage supply;
   a pull-down resistor; and
   means for electrically connecting said first data bus line through said pull-down resistor to ground, the opening of said at least one switch resulting in a low logic level on said first data bus line when said first data bus line is in a high impedance mode, the closing of said at least one switch resulting in a high logic level on said first data bus line when said first data bus line is in a high impedance mode.

2. Apparatus in accordance with claim 1 wherein eight data bus lines are utilized to interface said computer system to said at least one computer bus device and wherein each one of said eight data bus lines are individually electrically connected through respective switches and pull-up resistors to said positive voltage supply and wherein each one of said eight data bus lines is individually electrically connected through respective pull-down resistors to ground.

3. In a computer system in which a computer is interfaced to at least one computer bus device through address bus lines and data bus lines and in which an address from said computer which is not decoded by said at least one computer bus device results in said data bus lines being in a high impedance mode, the improvement comprising a method for transferring data from a switch to said computer wherein a first data bus line is electrically connected through said switch and a pull-up resistor to a positive voltage supply and is electrically connected through a pull-dwon resistor to ground, said method comprising the steps of:
   opening said switch to thereby pull said first data bus line to a low logic level if it is desired to transfer a data bit having a low logic level from said switch through said first data bus line to said computer;
   closing said switch to thereby pull said first data bus line to a high logic level if it is desired to transfer a data bit having a high logic level from said switch through said first data bus line to said computer; and
   providing an address from said computer which is not decoded by said at least one computer bus device to enable said computer to read the position of said switch.

* * * * *